United States Patent [19]
Visser

[11] 3,826,968
[45] July 30, 1974

[54] ARRANGEMENT FOR SUPERVISING AN ELECTRIC CIRCUIT

[75] Inventor: Robertus Gerardus Visser, Amsterdam, Netherlands

[73] Assignees: Johan W. Visser, Amstelveen, Sprotlaan; Frans Verlinden, Breukeleveen, Herenweg, both of Netherlands

[22] Filed: Sept. 19, 1973

[21] Appl. No.: 398,799

[52] U.S. Cl............ 322/99, 317/43, 340/248 P, 340/253 P
[51] Int. Cl.................... G08b 21/00, H02h 3/18
[58] Field of Search........ 322/26, 99; 317/13 R, 39, 317/43, 50, 58, DIG. 1; 307/130, 131, 10; 340/248 P, 253 R, 253 B, 253 C, 253 P, 253 S, 256

[56] References Cited
UNITED STATES PATENTS

| | | |
|---|---|---|
| 2,776,420 | 1/1957 | Woll............................ 340/253 S X |
| 2,839,743 | 6/1958 | Baumgartner.................. 340/253 C |
| 3,521,264 | 7/1970 | Limon............................ 340/253 R |
| 3,706,966 | 12/1972 | So et al...................... 340/248 P X |

*Primary Examiner*—J. D. Miller
*Assistant Examiner*—Robert J. Hickey
*Attorney, Agent, or Firm*—Waters, Roditi, Schwartz & Nissen

[57] ABSTRACT

Arrangement for supervising an electric circuit in a vehicle wherein a primary winding inserted in the circuit to be supervised is coupled with a secondary winding having a grounded centre tap. The ends of the secondary winding are each connected through a diode with an associated smoothing condenser. The voltages occurring across the smoothing condensers are each supplied to one of the inputs of a bistable trigger. The trigger is set when the circuit is switched on. If the circuit is intact, the trigger is reset by the transient occuring in the primary winding. If there is an interruption in the circuit, the trigger is left in its set condition. The trigger is returned to its set condition if an interruption occurs during the use of the circuit. Thus, the condition of the trigger indicated whether the circuit is operative.

5 Claims, 1 Drawing Figure

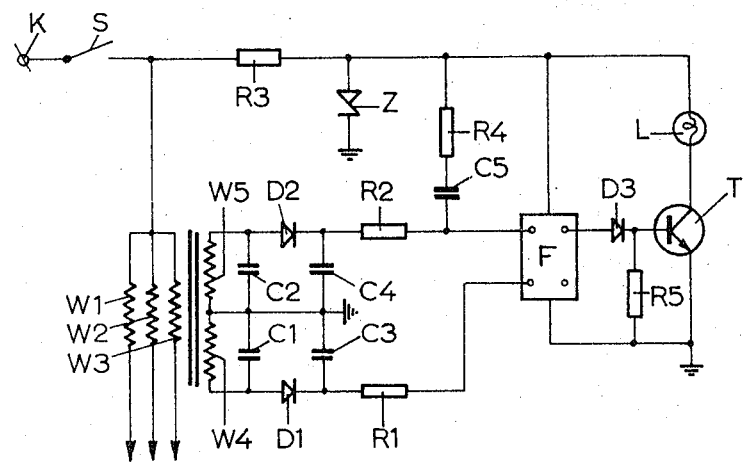

ARRANGEMENT FOR SUPERVISING AN ELECTRIC CIRCUIT

BACKGROUND OF THE INVENTION

The invention relates to a circuit arrangement for supervising an electric circuit in a vehicle.

Especially in large vehicles, such as trucks, it is of importance that the driver may supervise the various electric circuits, such as lighting or heating circuits, from his seat.

Up to now, there were no arrangements available whereby this supervision was possible in a simple and effective manner.

BRIEF SUMMARY OF THE INVENTION

It is the object of the invention to provide a simple and effective arrangement for supervising one or more electric circuits in a vehicle.

An other object of the invention is to provide a circuit arrangement for the supervision of electric circuits wherein any failure of a circuit to be supervised, either initially existing or occurring during use, is indicated to the driver by a suitable indicator such as a lamp. A further object of the invention is to provide a circuit arrangement of the above mentioned kind comprising a plurality of primary windings each laid out for a different power so that the arrangement may be used for the supervision of circuits with different power capacities.

According to the invention, a primary winding inserted in the circuit to be supervised is coupled with a secondary winding, having a grounded centre tap. The ends of the secondary winding are each connected through an associated diode with an associated smoothing condenser. The voltages occurring across the said smoothing condensers are each supplied to one of the inputs of a bistable trigger. The trigger is set when the circuit is switched on and reset by the transient impulse induced in the secondary winding when the circuit is closed. An interruption of the circuits induces a transient impulse in the secondary winding whereby the trigger is returned to its set condition.

Thus, the condition of the circuit to be supervised is indicated by the condition of the bistable trigger. In order that this condition may be readily observed the load resistor of one of the transistors of the trigger may comprise a lamp which is ignited upon interruption of the circuit. It is also possible to use a separate indicator lamp, controlled by the set output of the trigger.

In a preferred embodiment of the invention, a voltage is supplied when the arrangement is switched on to the series connection of a resistor and a zener diode. The voltage across the zener diode is used as a feed voltage for the trigger and is also supplied through a condenser to the set input of the trigger whereby the same is brought into its set condition.

Since the transient impulses generated when the circuit is closed and interrupted, respectively, are of course dependent on the power of the circuit to be supervised, it is preferable to provide the arrangement with a plurality of primary windings each laid out for a different power, so that one of these windings may be inserted in the cicruit to be supervised according to its power consumption.

BRIEF DESCRIPTION OF THE DRAWING

The single FIGURE of the drawing shows the circuit diagram of an arrangement according to the invention.

DETAILED DESCRIPTION

The circuit arrangement shown in the drawing is connected with a feeding terminal K carrying a D.C. voltage of for instance 12 volts. A switch S has been provided for switching on the circuit to be supervised. The arrangement comprises three primary windings W1, W2, W3, coupled with a secondary winding W4, W5, provided with a centre tap. The windings W1, W2 and W3 are laid out for different powers, for instance 8 Watts, 18 or 21 Watts and 45 Watts. The circuit to be supervised is connected in series with the winding laid out for the required power, while the other primary windings remain unused.

The centre tap of the secondary winding is grounded and filter condensers C1 and C2 are connected in parallel with each of the portions W4 and W5 of the secondary winding. The ends of the secondary winding are each connected through a diode D1 or D2, respectively with an associated smoothing condenser C3 or C4, respectively. The direct voltage across condenser C3 is supplied through a resistor R1 to the reset input of a bistable trigger F and the direct voltage across condenser C4 is supplied through resistor R2 to the set input of said trigger.

When the switch S is closed, the voltage of 12 volts carried by terminal K is also supplied to a series circuit consisting of a resistor R3 and a zener diode Z, whereby a voltage of about 5 volts is developed across the zener diode; this voltage is supplied to the trigger F as a feed voltage. When the switch S is closed, the said voltage is also supplied through a resistor R4 and a coupling condenser C5 to the set input of the trigger F whereby the trigger is brought into its set condition. This occurs practically immediately i.e. within a very short time interval.

When the circuit to be supervised is found to be interrupted, the trigger F remains in its set condition. If the circuit is intact, a transient impulse is induced in the secondary winding W4, W5. The sense of the coupling between the primary and the secondary winding and the polarities of diodes D1 and D2 have been chosen in such manner that a direct voltage occurs in this case across condenser C3, whereby the trigger F is reset. It will be understood that it takes some time for condenser C3 to develop a sufficient voltage for actuating the trigger, so that the setting and the resetting of the trigger occur successively. If the circuit to be supervised is initially intact, but becomes interrupted at a later time, a transient impulse of opposite polarity is induced in the secondary windings W4 and W5, whereby a direct voltage is developed across condenser C4, so that the trigger is returned to its set condition.

It appears from the above description that the trigger F is in its reset condition, whenever the circuit to be supervised is intact, and in its set condition whenever this circuit is interrupted. Thus, the condition of the circuit may be derived from the condition of the trigger. For this purpose, the load resistor of the transistor of the trigger which is conductive in the set condition may be carried out as an indicator lamp which may be positioned on the dashboard of the vehicle. In the embodiment shown in the drawing, a different method is used, wherein the set output of the trigger F is connected through a diode D3 with the base of a transistor, which is also connected with the emitter through a biasing resistor R5. The collector circuit of the transistor contains an indicator lamp L. Thus, the lamp is ignited when the trigger F is in its set condition i.e. when the circuit to be supervised is interrupted.

I claim:

1. An arrangement for supervising an electric circuit in a vehicle, comprising a feeding terminal, a switch for connecting said circuit with said feeding terminal, a primary winding inserted in said circuit, a secondary winding coupled with said primary winding and having a grounded centre tap, a first and a second smoothing condenser connected in series and having a grounded junction, a first diode connecting one end of said secondary winding with said first smoothing condenser, a second diode connecting the other end of said secondary winding with said second smoothing condenser, a bistable trigger having a set input and a reset input, means connecting said first smoothing condenser with said reset input and connecting said second smoothing condenser with said set input, a coupling condenser connecting said set input through said switch with said feeding terminal whereby said trigger is immediately set when said switch is closed, and an indicator operative in the set condition of said trigger for indicating an interruption of said circuit, the sense of the coupling between said primary and said secondary winding and the polarities of the said diodes being selected in such manner that an actuating voltage for said trigger is generated across said first smoothing condenser by the transient impulse induced in said secondary winding when said circuit is closed and that an actuating voltage for said trigger is generated across said second smoothing condenser by the transient impulse induced in said secondary winding when said circuit is interrupted, whereby said trigger is reset when said circuit is intact, left in its set condition when said circuit is found interrupted and returned to its set condition when said circuit is interrupted during use.

2. An arrangement as claimed in claim 1, wherein said trigger has an output terminal actuated in its set condition, further comprising an indicator lamp controlled by said output terminal.

3. An arrangement as claimed in claim 1, further comprising a series circuit consisting of a resistor and a zener diode and connected through said switch with said feeding terminal and means for supplying the voltage across said zener diode to said trigger as a feed voltage.

4. An arrangement as claimed in claim 3, wherein said coupling condenser connects the junction between said resistor and said zener diode with said set input.

5. An arrangement as claimed in claim 1, comprising a plurality of primary windings, each laid out for a different power, only one of the said primary windings being inserted in said circuit, according to the power consumption of said circuit.

* * * * *